United States Patent [19]

Doura et al.

[11] 4,418,177

[45] Nov. 29, 1983

[54] THERMOSETTING ADHESIVE COMPOSITIONS AND USE

[75] Inventors: Fumihiro Doura, Sakai; Masamitsu Nakabayashi, Sennan; Taiji Morimoto, Kawanishi, all of Japan

[73] Assignee: Takeda Chemical Industries, Ltd., Osaka, Japan

[21] Appl. No.: 341,700

[22] Filed: Jan. 22, 1982

[30] Foreign Application Priority Data

Jan. 26, 1981 [JP] Japan .................................. 56-10548

[51] Int. Cl.$^3$ .............................................. C08L 23/26

[52] U.S. Cl. ........................................ 525/57; 525/58; 525/61

[58] Field of Search .............................. 525/58, 57, 61

[56] References Cited

U.S. PATENT DOCUMENTS 3,542,902 11/1970 Dunion, Jr. et al. ............... 525/548

*Primary Examiner*—Wilbert J. Briggs, Sr.

*Attorney, Agent, or Firm*—Wenderoth, Lind & Ponack

[57] ABSTRACT

A thermosetting adhesive composition is disclosed which contains (a) a half-ester product of a saponified ethylene/vinyl ester copolymer with a dicarboxylic acid and (b) a solid or liquid epoxy resin, and this composition may further optionally contain a compound bearing two or more carboxyl groups, which is useful as a structural adhesive. The composition has a good storage stability and a good solubility to solvents, and can be cured at relatively low temperature in a shortened time. After curing, the composition shows good heat-resistance and has good adhesive properties.

11 Claims, No Drawings

THERMOSETTING ADHESIVE COMPOSITIONS AND USE

The present invention relates to novel thermosetting adhesive compositions and use. More particularly, the present invention relates to a thermosetting adhesive composition excellent in bonding properties and in storage stability at room temperature, which contains a particular carboxyl-containing copolymer and an epoxy resin, and use thereof.

Saponified products of ethylene/vinyl ester copolymers and their carboxyl-containing copolymers have good melt-flow characteristics, and, when cured, show toughness and adherence, and due to their strong adhesivity toward various materials such as metals, glass, ceramics, wood, fibers and plastics, they have been widely used in their application areas as a hot-melt type adhesive. However, said saponified products or their carboxyl-modified copolymers are thermoplastic and, therefore, have a defect that their adhesive strength falls off sheerly around the temperatures of their melting points. Consequently, they are merely applied to the field of non-structural adhesives where heat-resistant adhesion is not required, and even in such application, they show poor resistance to organic solvents.

In order to ameliorate such defects, there have been made some attempts, for example, to increase heat resistance by a combination of a carboxyl-modified product of said saponified copolymer and a polyisocyanate compound whose isocyanate groups are protected (for example, Japanese Unexamined Patent Laid-Open No. 19275/1980, etc.), to enhance heat and water resistance through a combination of said saponified copolymer with an organic silane compound (for example, Japanese Unexamined Patent Laid-Open No. 53541/1976, etc.) and to increase solvent resistance by a combination of said saponified copolymer with an epoxy resin (for example, Japanese Examined Patent Publication No. 30398/1971, etc.). However, the former two proposals entail the production of reaction-by-products caused by dissociation of blocking agents and formation of $H_2O$, alcohols and acids. Such by-products are apt to attach the bonding layer and cause undesirable effects such as deterioration of bonding strength, and this narrows their application fields. The combination with an epoxy resin as proposed in the latter, though it is free from such defects, demands heat-curing treatment at elevated temperatures in the neighborhood of 200° C. for a long time because of slow reaction of hydroxyl groups of said saponified copolymer with epoxy groups of an epoxy resin, and unfavorable phenomenon is observed that such severe curing conditions often bring about degradation of substrate materials. For the purpose of eliminating these difficulties, addition of various kinds of catalysts has been proposed, but this decreases storage stability of the adhesive composition in which said saponified copolymer and an epoxy resin are blended.

The present inventors made an extensive research on the adhesive composition that frees from the problems found in the aforesaid adhesives. As a result, it was found that a combination of a half-ester product obtained by reacting a saponified ethylene/vinyl ester copolymer with a dicarboxylic acid, and an epoxy resin can provide a thermosetting adhesive composition excellent in bonding properties and in storage stability, producing no by-products during heat-curing and showing greatly improved resistance to heat and solvents. These findings led to the present invention.

Thus, the present invention covers a thermosetting adhesive composition which contains (a) a half-ester product of a saponified ethylene/vinyl ester copolymer with a dicarboxylic acid and (b) an epoxy resin, and this composition may further optionally contain a compound bearing two or more carboxyl groups.

The saponified ethylene/vinyl ester copolymers usable as a raw material in the present invention are produced by copolymerizing ethylene with vinyl ester monomer by a known procedure (for example, U.S. Pat. No. 2,200,429; U.S. Pat. No. 2,703,794, etc.) to obtain a copolymer normally having a melt index of 0.1 to 500 g/10 min, followed by hydrolysis of about 10 to 100%, preferably 40 to 95%, of the ester moiety of said copolymer according to a known procedure (for example, U.S. Pat. No. 2,386,347; U.S. Pat. No. 3,344,129, etc.).

As the vinyl ester monomer, use is made of vinyl esters of aliphatic and aromatic fatty acics, such as vinyl acetate, vinyl propionate, vinyl butyrate, vinyl formate and vinyl benzoate. Among these monomers, vinyl acetate is of particular value.

Use can be made of such saponified ethylene/vinyl ester copolymers whose ethylene content is not less than 50 mole%. Low ethylene content spoils melt-flow characteristics of the half-ester products and their strong adhesivity does not be always ensured. Ethylene content generally ranges from about 50 mole% to 99 mole%, preferably from about 78 mole% to 93 mole%. Useful are the saponified copolymers whose content of a vinyl alcohol unit after saponification is more than 1 mole% against the total number of moles of ethylene and vinyl ester before saponification. If the content of a vinyl alcohol unit is smaller than this amount, the half-ester product derived from such saponified copolymer, when being combined with an epoxy resin, merely produce insufficient curing effect, and it fails to achieve sufficient heat-resistant adhesion which is one of the objects of the present invention.

The saponified ethylene/vinyl acetate copolymers usable in the present invention have a melt index (as specified in ASTMD-1238) of about 0.1 to 500, preferably 0.5 to 300.

The half-ester product according to the present invention can be produced by subjecting said saponified copolymer and a dicarboxylic acid to esterification. As the dicarboxylic acid, the corresponding anhydride can be conveniently used in the practical reaction.

The dicarboxylic anhydrides employable are a dicarboxylic anhydride of the general formula,

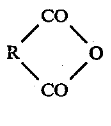

(wherein R is a hydrocarbon residue having up to 12 carbon atoms).

As such dicarboxylic anhydrides, use is made of aliphatic dicarboxylic anhydrides such as succinic anhydride, maleic anhydride, citraconic anhydride and itaconic anhydride; aromatic dicarboxylic anhydrides such as phthalic anhydride; alicyclic dicarboxylic anhydrides such as cyclohexyl-1,2-dicarboxylic anhydride (HHPA), 4-methyl-cyclohexyl-1,2-dicarboxylic anhydride (4-MHHPA), cyclohexa-4-en-1,2-dicarboxylic anhydride (THPA), 4-methylcyclohexa-4-en-1,2-dicarboxylic anhydride (4-MTHPA), 1,2,3,4,5,8,9,10-octahydronaphthalene-2,3-dicarboxylic anhydride, bicyclo(2,2,2)octa-5-en-2,3-dicarboxylic anhydride, bicyclo(2,2,1)hepta-5-en-2,3-dicarboxylic anhydride, methylbicyclo(2,2,1)hepta-5-en-2,3-dicarboxylic anhydride and 7-oxabicyclo(2,2,1)hepta-5-en-2,3-dicarboxylic anhydride and so on.

Among these dicarboxylic anhydrides, the alicyclic dicarboxylic anhydrides excel in the solubility in various solvents or in storage stability when the resulting dicarboxylic half-esters are mixed with an epoxy resin. Most preferable are HHPA, 4-MHHPA, THPA and 4-MTHPA.

The esterification reaction between these dicarboxylic anhydrides and the aforesaid saponified copolymers is normally carried out in a solvent. As the solvent, use can be made of, for example, benzene, toluene, xylene, hexane and tetrahydrofurane, etc., and toluene and xylene are suitable. The amount of the solvent to be used is normally 0.5 to 10 times by weight to the amount of a saponified ethylene/vinyl ester copolymer. The reaction proceeds at a temperature of 30° to 150° C., preferably 50° to 120° C., for 0.5 to 10 hours, preferably 1 to 5 hours. The reaction can be advantageously conducted by adding to the reaction mixture organic acids, inorganic acids or metal compounds, which are conventionally used for accelerating the reaction, such as triethylamine, pyridine, sulfuric acid, sodium hydroxide, sodium methoxide and sodium acetate.

The product obtained by such esterification has the structure of the so-called dicarboxylic half-ester having carboxyl groups at its terminals formed by the reaction of hydroxyl groups in the saponified copolymer with the acid anhydride (∤OCO—R—COOH).

The half-ester product can be isolated by per se known separating and purifying manners and it is generally advisable to separate the product as powder by adding a nonsolvent such as methanol to the reaction mixture, followed by reprecipitation and washing. The degree of esterification of such half-ester product, the proportion in which hydroxyl groups of the saponified copolymer are esterified with the dicarboxylic anhydride, can be suitably selected in the range of 1 to 100%, preferably 10 to 90%. A half-ester product with an esterification degree of more than 10% can produce thermosetting materials having by far increased heat and solvent resistance.

The epoxy resins usable in the present invention are ether-type, ester-type and alicyclic-type epoxy resins having two or more epoxy groups and an epoxide equivalent weight of about 100 to 3000. These epoxy resins include solid epoxy resins and liquid epoxy resins.

As the ether type resins, there may be mentioned bisphenol A type epoxy resins, novolak type epoxy resins, polyphenol type epoxy resins annd aliphatic type epoxy resins, and as the ester type resins, there may be mentioned aromatic type epoxy resins, alicyclic type epoxy resins and aliphatic type epoxy resins. Further, there may be mentioned ether-ester type epoxy resins having ether annd ester segments in the molecule. These epoxy resins are all the known epoxy resins, and of particular value among these resins are those of ether type consisting of epichlorohydrin and bisphenol A (sold under the trade name of "Epotohto ®YD-Series" by Tohto Kasei Co. in JAPAN). In place of the partial amount of or the whole amount of the above epoxy resins, furthermore, use may be made of monomeric epoxy compounds having not less than two epoxy groups, such as ethylene glycol diglycidyl ether, polyethylene glycol diglycidyl ether, glycerine diglycidyl ether, trimethylolpropane glycidyl ether and 1,1-hexanediol diglycidyl ether.

Among the epoxy resins defined above, the solid resins are mainly useful as a film or sheet type adhesive composition and the liquid resins are mainly useful as a gun or nozzle type adhesive composition because the liquid ones decrease the viscosity of the composition. Generally stating, the epoxy resins having an epoxide equivalent weight of about 100 to 350 are liquid [for example, OS Resin ®101 (epoxy equivalent 320±10), OS Resin ®102 (epoxy equivalent: 280±10), OS Resin ®103 (epoxy equivalent: 280±10) and OS Resin ®105 (epoxy equivalent: 290±10) manufactured and marketed by Okamura Seiyaku K.K. in JAPAN are available as the ester type liquid epoxy resin having two epoxy groups, and Epotohto ®YD-128 is available as the ether type liquid epoxy resin having two epoxy groups]. Though the epoxy resins are in solid form, they can be changed into liquid form by mixing monomeric epoxy compounds having not less than two epoxy groups as exemplified above. Such mixed epoxy resins as in the liquid form are defined as liquid epoxy resins in the present invention.

The present invention is basically a composition containing components (a) and (b). However, another embodiment may further optionally contain a compound bearing two or more carboxyl groups as a third component. By addition of this third component, the composition offers much more increased adhesion, i.e., peel strength and tensile sheer strength.

As the compound bearing two or more carboxyl groups, there may be mentioned a monomeric dicarboxylic acid as defined before (e.g. hexahydrophthalic acid) and a polymer bearing two or more carboxyl groups in the molecule compatible with the components (a) and (b). Examples of the polymer are polyester and modified butadiene/acrylonitrile copolymer, etc. The polyester can be obtained by a conventionally known condensation polymerization of polycarboxylic acids such as terephthalic acid, isophthalic acid, tetrahydrophthalic acid, adipic acid and sebacic acid, etc. or anhydride thereof with polyalcohols such as ethylene glycol, neopentyl glycol, butanediol, trimethylolpropane and pentaerythritol etc., if necessary, together with oxycarboxylic acids, monocarboxylic acids or monoalcohols in order to adjust acid value or molecular weight. The polyesters employable in the present invention have an acid value of about 10 to 100, preferably 30 to 90 (for example Vilon ®GV-230, manufactured and marketed by Toyobo Co. Ltd. in JAPAN). On the other hand, modified butadiene/acrylonitrile copolymer bearing two or more carboxyl groups is a known polymer and can be the copolymerization of butadiene monomer and acrylonitrile monomer and by the modification of the copolymer (for example, Hycar ®-CTMN, manufactured and marketed by UBe Industries LTD. in JAPAN). Usable are those having a molecular weight of ca. 1,000 to 10,000.

The thermosetting adhesive composition of the present invention can be prepared by blending (a) the aforementioned dicarboxylic half-ester product with (b) the aformentioned epoxy resin, and, when necessary, further with a third component.

As the procedures for preparing the blended composition of the present invention, use can be made of various conventionally known ones such as melt blending and solvent blending. As the half-ester product of the present invention has good solubility in solvent, the components (a) and (b), if necessary, with a third component may be dissolved in advance in suitable solvents (for example, aromatic solvents such as toluene and xylene, ether solvents such as tetrahydrofuran, etc.), followed by mixing the resulting solutions and evaporating the solvents to obtain a blended composition or the components may be melt-mixed while they are in the viscous stage at the temperatures lower than the temperature at which thermosetting begins. The melt-mixing temperature various depending upon the type of epoxy resins (b), and are about 70° to 120° C., preferably about 90° to 110° C.

In mixing the components, use can be made of mixing equipment such as mixer, kneader, hot roll mill, extruder or the Banbury mixer or Brabender Plastograph mixer. The compositions thus blended are usually formed into pellet, pill, sheet and film etc. according to the requirement of the fields to be applied. The compositions in the form of pellet and pill are usually applied to substrates by means of various types of known hot-melt applicators.

In the production of the composition of the present invention, the epoxy resin is used in the amount of about from 1/100 to 1.5 times by weight, preferably of about 1/10 to 1, to the amount of the component (a). When the content of the epoxy resin is over about 150 weight %, the resultant thermoset material becomes brittle, and shows decreased adhesion. The content of lower than about 1 weight % fails to provide heat- and solvent resistance which is the characteristic feature of the present invention.

When the third component is further added to the composition, the epoxy resin (b) is used in an amount of about 0.1 to 10 equivalent, preferably about 1 to 2, of the epoxide per one equivalent of the carboxyl groups of the third component and the component (a).

As the procedure of bonding two substrates by using the adhesive composition of the present invention can be used the procedures known per se.

Taking advantage of the half-ester product possessing good solubility in solvents, the composition can be used as solvent type. For example, there may be adopted the procedure which comprises applying the composition onto one substrate (application is made by spray, brush, roll coater, doctor knife, etc.), heating at about 50° to 150° C. to remove the solvent, and placing the other substrate on it, followed by heating under pressure. Also, taking advantage of the stability of the composition to the elevated temperature of around 120° C., bonding can be carried out by the following procedures. One procedure comprises changing the blended composition into a film or sheet form by the extrusion molding technique, and placing the resulting film or sheet between two substrates, followed by heating to bond the substrates. Another procedure comprises laminating the blended composition on one substrate by the extrusion coating technique, and placing the other substrate on it, followed by heating to bond the substrates each other. The heating preferably starts at temperatures lower than the temperature at which thermosetting of the composition begins while pressing to ensure sufficient stick to substrates, and then pressure is applied under the temperatures higher than the temperatures at which thermosetting begins. Normally, such heating temperature is about 130° to 300° C., and the pressure is about 0.5 to 200 $kg/cm^2$. In the pressing and heating step, there is formed strong bonding between the composition layer and substrates, and at the same time, the composition itself cures through cross-linking and comes to retain enhanced adhesive force.

And, the present invention offers the characteristic that the curing reaction, the reaction between carboxyl and epoxy groups different from the reaction between hydroxyl and epoxy groups, can be allowed to proceed under relatively mild conditions without catalysts and this does not bring about deterioration of the quality of substrates. For the purpose of shortening the reaction time, however, the normally known curing catalysts for epoxy resins may be contained in the composition, generally in the quantities of, for example, 0.1 to 5 weight % based on the total composition. As such catalysts, use may be made of those as described in Irving Skeist's "Epoxy Resins" (published in 1958 by Reinhold Publishing Co.).

It is observed that the thermosetting adhesive composition of the present invention provides remarkably improved bonding properties toward metal (e.g. aluminium, iron and steel, etc.), FRP, plastics (e.g. polyethylene film, etc.) and other substrate materials, as compared with those without containing an epoxy resin. Particularly, the present composition shows strong bonding strength even to oily steel.

Such improvement in the bonding properties is observed when two bonded substrates are peeled off at room temperature. This performance is more noticeably recognized when the bonded substrates are peeled off at high temperatures.

Therefore, the composition of the present invention is particularly suitable as structural adhesives for metal, FRP and plastics materials.

Furthermore, the composition of the present invention exhibits excellent stability at temperatures not higher than the curing temperature and remarkable storage stability at room temperature.

As mentioned above, the composition of the present invention can be easily changed into a form of film, sheet and other appropriate shapes, because the composition is essentially thermoplastic at the temperature lower than the curing temperature, and further can offer one-can type curable adhesive composition with good storage stability where the composition is in the form of a solution. According to the present invention, furthermore, the compositions which do contain no organic solvent at all can be provided, if required, and they offer the great advantage in eliminating the need of special drying step and securing working safety or not causing environmental pollution.

The present compositions are also useful as a hemming adhesive, a spot weld adhesive or a mastic adhesive in metal fabricating industries, particularly in the automotive industries. Especially, those containing liquid epoxy resins have a relatively low viscosity and, therefore, can be preferably applied to metals by means of hot-melt applicators equipped with a gun or with a nozzle. A metal article bonded with the present composition, particularly the composition containing component (a), a liquid epoxy resin (b') and a compound bearing two or more carboxyl groups show high adhesivity in tensile sheer strength.

Thus, the compositions of the present invention are remarkably useful for practical purpose.

The adhesive composition according to the present invention can be admixed with fibrous reinforcing materials (for example, glass, boron, etc.) and inorganic fillers as well as other conventionally used compounding agents, as far as they remain within the range of not decreasing its adhesive characteristics.

The examples given below illustrate the present invention specifically. The "%" and "part" in the examples are all indicated on weight basis.

EXAMPLE 1

In a 20-l reaction vessel of stainless steel were placed 3225 parts of xylene and 1500 parts of ethylene/vinyl acetate copolymer (vinyl acetate content: 28% and melt index: 150 g/10 min; trade name "Evaflex #220", manufactured and marketed by Mitsui Polychemical Co. Ltd. in JAPAN). After dissolving the mixture, 880 parts of methanol and 76 parts of 28% sodium methylate/methanol solution were added to the solution, and the mixture was reacted at 45° to 50° C. for 60 minutes under stirring. 50 parts of water was then added thereto, and stirring was continued for 30 minutes, to stop the reaction.

Sampling of a small amount and analysis indicated that the reaction product thus obtained exhibited a saponification rate of 92% and a melt index of 92 g/10 min.

The reaction solution was heated to 120° C., and after the methanol and methyl acetate, by-produced, were completely distilled off, 100 parts of HHPA was added thereto, followed by allowing the reaction to proceed at 110° to 115° C. for 1.5 hours. The reaction solution was cooled down to 70° C., and 1200 parts of methanol was added in order to allow the polymer to separate out. Separation and drying afforded a powdery product with an esterification degree of 10% and a melt index of 66 g/10 min.

After 1000 parts of the powdery half-ester product and 220 parts of pulverized solid epoxy resin [trade name, "Epotohto ®YD-012" (epoxide equivalent: 650)] were subjected to dry blending, the mixture was melt-mixed at 120° C. by the use of a small-sized extruder for laboratory use, thus yielding the adhesive composition in the form of pellet.

Specimens of the adhesion test were prepared by making a 0.1 mm thick sheet from said pellet by means of a hot press molding machine at the molding temperature of 100° C., and putting the sheet between two defatted 0.2 mm-thick aluminium plates like sandwitches, followed by subjecting to laminating under contact pressure at 160° C. for 30 minutes.

As reference example 1, a specimen for the adhesion test was prepared in a similar manner with use of the half-ester product not containing the epoxy resin (Epotohto ®YD-012).

Determination of bonding strength was made by means of a 180-degree peel adhesion using an Instron tension tester in the conditions of 25 mm of a peel adhesion test specimen width, 200 mm/min of a cross-head speed and 23° C. and 80° C. of a peel adhesion testing temperature, respectively. Table 1 shows the results of the peel adhesion tests.

TABLE 1

Peel Strength on Aluminium Sheet

| Adhesive Composition | Peel Strength (Kg/25 mm) Peel adhesion Test Temperature 23° C. | 80° C. |
|---|---|---|
| Example 1 | Al was broken off | 10.1 |
| Reference Example 1 | 5.0 | 3.0 |

EXAMPLES 2 AND 3

Varying the amount of HHPA in Example 1, the half-ester products with different degrees of esterification were prepared, and the products were mixed with Epotohto ®YD-012 of such amount as the carboxyl-/epoxy equivalent ratio might be 1.0. All subsequent procedures were performed in the same manner as in Example 1, and their performances were tested. Results are shown in Table 2.

TABLE 2

| Example | half ester product: Amount of HHPA added (parts) | Degree of esterification (%) | Peel strength (Kg/25 mm) 23° C. | 80° C. |
|---|---|---|---|---|
| Example 2 | 170 | 15 | Al was broken off. | 10.5 |
| Example 3 | 340 | 35 | Al was broken off | 9.7 |
| Reference Example 2 | 170 | 15 | 9.5 | 4.0 |
| Reference Example 3 | 340 | 35 | 9.0 | 3.0 |

<Note>
Reference Examples 2 and 3 are the cases in which half ester product was alone used. Namely, in these References, the epoxy resin is not mixed as in Example 2 and 3.

EXAMPLES 4 THROUGH 6

All procedures were performed in the same manner as in Example 1, except that the alicyclic dicarboxylic anhydrides shown in Table 3 were employed in place of HHPA, and there were obtained powdery half-ester products as shown in Table 3, respectively.

These materials were compounded with Epotohto ®YD-012 of such amounts as the carboxyl/epoxy equivalent ratio might be 0.5, and all subsequent procedures were performed in the same manner as in Example 1, and then their bonding properties were tested. Results are shown in Table 3.

TABLE 3

| Example | half ester product: alicyclic dicarboxylic acid anhydride used | Amount (parts) | Degree of esterification (%) | Peel Strength (Kg/25 mm) 23° C. | 80° C. |
|---|---|---|---|---|---|
| Example 4 | 4-MHHPA | 210 | 21 | Al was broken off. | 9.5 |
| Example 5 | THPA | 190 | 19 | Al was broken off. | 8.5 |
| Example 6 | 4-MTHPA | 208 | 20 | Al was broken off. | 10.1 |
| Reference Example 4 | 4-MHHPA | 210 | 21 | 8.5 | 3.0 |
| Reference Example 5 | THPA | 190 | 19 | 8.4 | 1.5 |
| Reference | 4-MTHPA | 208 | 20 | 9.0 | 2.8 |

TABLE 3-continued

| Example | half ester product: alicyclic dicarboxylic acid anhydride used | Amount (parts) | Degree of esterification (%) | Peel Strength (Kg/25 mm) 23° C. | 80° C. |
|---|---|---|---|---|---|
| Example 6 | | | | | |

<Note>Reference Examples 4, 5 and 6 are the cases in which half ester product was alone used. Namely, in these Reference Examples, the epoxy resin is not added as in Examples 4, 5 and 6.

EXAMPLE 7

The adhesive composition obtained in Example 1 was allowed to stand for 3 months under surroundings of 20° C., 30° C., 50° C., 60° C. and 80° C., respectively. Then, each sample was subjected to test for its solubility in tetrahydrofuran. All of the samples were found to dissolve and no insoluble material due to cross-linking was observed. Thus, the composition was found to be stable for a long time.

EXAMPLE 8

In the same reaction vessel as used in Example 1 were placed 1720 parts of xylene and 1000 parts of ethylene/-vinyl acetate copolymer (vinyl acetate content: 40% and melt index: 55 g/10 min.; trade name "Everflex #40", manufactured and marketed by Mitsui Polychemical Co. in JAPAN), and after dissolving, 53 parts of methanol and 36 parts of 28% sodium methylate/methanol solution were added to the solution. After the mixture was allowed to react under stirring at 50° to 55° C. for 60 minutes, 50 parts of water was added thereto, followed by stirring for 30 minutes to stop the reaction. Sampling of a small amount and analysis indicated that a reaction product thus obtained had a saponification degree of 45%.

The temperature of the reaction solution was raised to 120° C., and the methanol and by-produced methyl acetate were completely distilled off. Then, 350 parts of HHPA was added to the residue, and the mixture was allowed to react at 110° to 115° C. for 1.5 hours. The reaction solution was cooled to 70° C., and 8000 parts of methanol was added thereto to allow the polymer to separate out. Separation and drying afforded a powdery half-ester product with a esterification degree of 93%.

20 Parts of the polymer was dissolved in 80 parts of toluene to prepare a viscous solution which was clear at room temperature. 6 Parts of Epotohto ®YD-128 (epoxide equivalent: 189) was added to 100 parts of the above solution and a uniform solution was prepared. Thus, a liquid adhesive composition was produced.

The solution was applied to, by use of a bar coater, on a 50μ thick polyester film to be 5μ in thickness of the solid adhesive layer. After the coated film was dried in a fan dryer at 100° C. for 5 minutes to evaporate the toluene, a 50μ thick polyester film was laid on the coated film, followed by heating on a press at a guage pressure of 40 kg/cm$^2$ and at 160° C. for 1 hour. The procedure gave a laminated film.

T-type peel adhesion tests were conducted by the use of a Instron tension tester in the conditions of 25 mm of a peel adhesion test specimen width, 200 mm/min of a crosshead speed and 23° C. and 80° C. of a peel adhesion testing temperature. Table 4 shows the results of the peel adhesion tests.

TABLE 4

| Adhesion Composition | Peel Strength (g/25 mm) Peel adhesion Test Temperature 23° C. | 80° C. |
|---|---|---|
| Example 8 | Polyester film was broken off. | 800 |
| Reference Example 7 | <100 | <100 |

In Referance Example 7 was employed the half ester product alone.

EXAMPLE 9

The same reaction as in Example 8 was carried out except for using 40 parts of maleic anhydride in place of HHPA and there was obtained a powdery half-ester product with a esterification degree of 15%. 100 parts of the product was mixed with 25 parts of epoxy resin (Epotohto ®YD-012), and a pellet adhesive composition was produced from the mixture by the use of an extrusion molding machine.

EXAMPLE 10

Except for employing 100 parts of phthalic anhydride in place of HHPA, the same procedure as in Example 8 was taken to yield a powdery half-ester product whose esterification degree was 30%. 100 Parts of the half-ester product and 50 parts of epoxy resin (Epotohto ®YD-012) was mixed and the mixture was formed into a pellet-like adhesive composition by means of an extrusion molding machine.

EXAMPLE 11

1000 Parts of the half-ester product obtained in Example 1, 500 parts of polyester (Vilon ®GV-230) and 500 parts of epoxy resin (Epotohto ®YD-012) were melt-blended at 110° C. for 30 minutes in a small kneader of 5-l capacity and the resulting composition was extruded into sheet having a thickness of 0.1 mm. The sheet was placed between two defatted cold-rolled steel plates (thickness of the each plate was 1.6 mm) like a sandwich. The bonding of the two plates was effected at 170° C. for 30 minutes under contact pressure. The adhesive strength of the specimen was measured at room temperature and at the crosshead speed of 1 mm/min. on a Instron tester basicially in compliance with JIS K-6850 (Testing Methods for Strength Properties of Adhesives in Sheer by Tension Loading.) The bonded steel article showed a tensile sheer strength of 230 Kg/cm$^2$.

EXAMPLE 12

1000 Parts of the half-ester product obtained in Example 1, 500 parts of polyester (Vilon ®GV-230) and 100 parts of epoxy resin (Epotohto ®YD-128) were melt-blended at 100° C. for 30 minutes. The resulting composition was applied to on oily steel plate (thickness: 0.8 mm) to be an amount of 50 g/m$^2$ by means of a hot-melt applicator equipped with a gun. On the plate thus prepared was placed another oily steel plate (thickness: 0.8 mm). The bonding of the plates was effected at 170° C. for 30 minutes under contact pressure. Using the same composition and the same plate (width: 1 inch) as above and under the same conditions as above, the specimen for test was prepared according to JIS K-6850. The bonding strength of the specimen was 150 Kg/cm$^2$ in terms of tensile sheer strength.

EXAMPLE 13

980 Parts of the half-ester product obtained in Example 1, 500 parts of polyester (Vilon® GV-230), 520 parts of epoxy resin (Epotohto® YD-012) and 100 parts of a trimethyrolpropane glycidylether (Adeca glycirol® ED-505, manufactured and marketeded by Asahi Denka Kogyo K.K. in JAPAN) were melt-blended at 90° C. for 30 minutes in a kneader. The resulting composition was applied on to a defatted cold-rolled steel plates to be an amount of 50 g/m$^2$ by means of a hot-melt application equipped with a gun. On the plate thus prepared was placed another defatted cold-rolled steel plate. The bonding of the two plates was effected at 170° C. or 30 minutes.

Using the same composition and the same plate (width: 1 inch) as above and under the same conditions as above, the specimen for test was prepared according to JIS K-6850. The bonding strength of the specimen was 220 Kg/cm$^2$ in terms of tensile sheer strength which was measured in the same conditions as in Example 11.

What is claimed is:

1. A thermosetting adhesive composition which contains (a) a half-ester product of a saponified ethylene/vinyl ester copolymer with a dicarboxylic acid, the esterification degree being 10 to 90%, (b) a liquid epoxy resin having an epoxide equivalent of about 100 to 350, the component (b) being used in the amount of about 1/100 to 1.5 times by weight to the component (a), and (c) a polymer bearing two or more carboxyl groups selected from a polyester having an acid value of about 10 to 100 and a modified butadiene/acrylonitrile copolymer having a molecular weight of ca. 1,000 to 10,000, the component (b) being in an amount of about 0.1 to 10 equivalent of the epoxide per one equivalent of the carboxyl groups of the components (a) and (c).

2. A thermosetting adhesive composition according to claim 1, wherein the ethylene content of the ethylene/vinyl ester copolymer is from about 50 mole% to 99 mole%.

3. A thermosetting adhesive composition according to claim 1, wherein the saponification degree of the saponified ethylene/vinyl ester copolymer is about 10 to 100% of the ester moiety.

4. A thermosetting adhesive composition according to claim 1, 2 or 3, wherein the vinyl ester of the saponified ethylene/vinyl ester copolymer is vinyl acetate.

5. A thermosetting adhesive composition according to claim 1, wherein the dicarboxylic acid is the corresponding acid anhydride represented by the formula

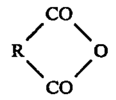

whose R is a hydrocarbon residue having up to 12 carbon atoms.

6. A thermosetting adhesive composition according to claim 5, wherein the acid anhydride is an alicyclic acid anhydride.

7. A metal article bonded with a thermosetting adhesive composition according to claim 1.

8. A thermosetting adhesive composition according to claim 6, wherein the alicyclic acid anhydride is cyclohexyl-1,2-dicarboxylic anhydride, 4-methylcyclohexyl-1,2-dicarboxylic anhydride, cyclohexa-4-en-1,2-dicarboxylic anhydride or 4-methylcyclohexa-4-en-1,2-dicarboxylic anhydride.

9. A thermosetting adhesive composition according to claim 6, wherein the component (b) is used in an amount of about 1/10 to 1 time by weight to the component (a).

10. A thermosetting adhesive composition according to claim 2, wherein the ethylene content of the ethylene/vinyl ester copolymer is from about 78 mole % to 93 mole %.

11. A thermosetting adhesive composition according to claim 3, wherein the saponification degree of the saponified ethylene/vinyl ester copolymer is about 40 to 95% of the ester moiety.

* * * * *